(12) United States Patent
Cheon et al.

(10) Patent No.: US 8,750,148 B2
(45) Date of Patent: Jun. 10, 2014

(54) APPARATUS AND METHOD FOR HANDOVER USING RECEIVED SIGNAL STRENGTH AND RADIAL VELOCITY IN TERMINAL

(75) Inventors: Kyung Yul Cheon, Daejeon (KR); Ae Soon Park, Daejeon (KR); Ja Heon Gu, Seoul (KR); Sueng Jae Bae, Suwon-si (KR); Min Young Chung, Seoul (KR)

(73) Assignees: Electronics and Telecommunications Research Institute, Daejeon (KR); Sungkyunkwan University Foundation for Corporate Collaboration, Gyeonggi-do (KR)

( * ) Notice: Subject to any disclaimer, the term of this patent is extended or adjusted under 35 U.S.C. 154(b) by 298 days.

(21) Appl. No.: 13/167,249

(22) Filed: Jun. 23, 2011

(65) Prior Publication Data

US 2012/0120822 A1    May 17, 2012

(30) Foreign Application Priority Data

Nov. 15, 2010   (KR) ......................... 10-2010-0113529

(51) Int. Cl.
*H04L 1/00*    (2006.01)
*H04W 4/00*    (2009.01)

(52) U.S. Cl.
USPC ........................................ 370/252; 370/331

(58) Field of Classification Search
USPC ........................... 370/331–332, 252; 455/441
See application file for complete search history.

(56) References Cited

U.S. PATENT DOCUMENTS 6,052,598 A * 4/2000 Rudrapatna et al. ....... 455/456.1
2003/0050064 A1  3/2003 Davies et al.

FOREIGN PATENT DOCUMENTS

| KR | 10-2008-0065340 | 7/2008 |
| KR | 10-2010-0064833 | 6/2010 |
| KR | 1020100091390 | 8/2010 |

OTHER PUBLICATIONS

Gu, Jaheon et al., "A Method to Predict the Mobility of Mobile Devices by Using Cumulated RSSIs of Mobile Devices," Korea Information and Communication Society, vol. 42 (2010).
Gu, Jaheon et al., "Mobility-Based Handover Decision Mechanism to Relieve Ping-Pong Effect in Cellular Networks," 16th Asia-Pacific Conference on Communications (APCC), pp. 487-491 (2010).

* cited by examiner

*Primary Examiner* — Afshawn Towfighi
(74) *Attorney, Agent, or Firm* — Nelson Mullins Riley & Scarborough LLP; Anthony A. Laurentano, Esq.; Dipti Ramnarain, Esq.

(57) ABSTRACT

Provided is a handover apparatus and method for a terminal based on a received signal strength (RSS) and a radial velocity. The handover method may measure an RSS from a currently accessed base station and RSSs from candidate base stations for handover, may measure a radial velocity with respect to the currently accessed base station and radial velocities with respect to the candidate base stations for handover, and may perform a handover by determining a base station for handover based on the measured RSSs and the measured radial velocities when the RSS from the currently accessed base station is less than or equal to a reference RSS.

11 Claims, 3 Drawing Sheets

APPARATUS AND METHOD FOR HANDOVER USING RECEIVED SIGNAL STRENGTH AND RADIAL VELOCITY IN TERMINAL

CROSS-REFERENCE TO RELATED APPLICATION

This application claims the benefit of Korean Patent Application No. 10-2010-0113529, filed on Nov. 15, 2010, in the Korean Intellectual Property Office, the disclosure of which is incorporated herein by reference.

BACKGROUND

1. Field of the Invention

The present invention relates to a method of measuring a mobility of a terminal based on a received signal strength (RSS) in a wireless communication system, and a method and apparatus for handover based on the measured mobility.

2. Description of the Related Art

A terminal using wireless communication may move in any direction within a scope of a communication service. However, when the terminal desires to be out of the scope of a network currently accessed by the terminal, the terminal may require a handover so as to continuously perform communication although the terminal is out of the scope. In this example, when the mobility of the terminal is measured, a target base station to which the terminal is to be handed over may be determined in advance, so that the target base station may readily prepare radio resources to be allocated to the terminal, in advance. Also, a number of handovers completed to a network of an undesired base station may be reduced.

A ping-pong effect refers to a case where a terminal, which stays in a cell edge after being handed over to a predetermined network, is handed over back to a previous network or to a case where handover of a terminal placed at a cell edge is repeatedly performed since a handover determining index moves back and forth over a threshold. When the ping-pong effect occurs, a load in a network may increase due to a path update and signaling based on frequent handover. Also, when a handover is performed before the path update associated with a previous handover is completed, a delay and loss of packet may occur.

A ping-pong effect refers to a case where a terminal, which stays in a cell edge after being handed over to a predetermined network, is handed over back to a previous network or to a case where handover of a terminal placed at a cell edge is repeatedly performed since a handover determining index moves back and forth over a threshold. When the ping-pong effect occurs, a load in a network may increase due to a path update and signaling based on frequent handover. Also, when a handover is performed before the path update associated with a previous handover is completed, a delay and loss of packet may occur.

The third generation partnership project (3GPP) provides a handover hysteresis margin (HOM) scheme and a handover time-to-trigger (TTT) scheme so as to reduce a drawback caused by the ping-pong effect in a long-term evolution (LTE)-Advanced network, which is a next generation mobile communication standard. However, both the HOM scheme and the TTT scheme may not include a mobility of a terminal.

SUMMARY

An aspect of the present invention provides a handover apparatus and method for a terminal based on a received signal strength (RSS) and a radial velocity.

Another aspect of the present invention also provides a handover apparatus and method that measures, based on information associated with an RSS, a radial velocity indicating a speed of terminal that moves away from a base station, and determines a base station for handover based on the RSS and the radial velocity.

Still another aspect of the present invention also provides a handover apparatus and method that reduces a ping-pong effect occurring in a terminal based on an RSS and a radial velocity, and decreases a delay occurring in a handover.

According to an aspect of the present invention, there is provided a handover apparatus of a terminal, the handover apparatus including a received signal strength (RSS) measuring unit to measure an RSS from a currently accessed base station and RSSs from candidate base stations for handover, a radial velocity measuring unit to measure a radial velocity with respect to the currently accessed base station and radial velocities with respect to the candidate base stations for handover, and a handover processor to perform a handover by determining a base station for handover based on the measured RSSs and the measured radial velocities when the RSS from the currently accessed base station is less than or equal to a reference RSS.

According to another aspect of the present invention, there is provided a handover method of a terminal, the handover method including measuring an RSS from a currently accessed base station and RSSs from candidate base stations for handover, measuring a radial velocity with respect to the currently accessed base station and radial velocities with respect to the candidate base stations for handover, determining a base station having a highest RSS among the currently accessed base station and the candidate base stations for handover when the RSS from the currently accessed base station is less than or equal to a reference RSS, determining a base station having a lowest radial velocity among the currently accessed base station and the candidate base stations for handover, and performing a handover to the base station having the highest RSS when the base station having the highest RSS is identical to the base station having the lowest radial velocity, and the base station having the highest RSS is different from the currently accessed base station.

Additional aspects, features, and/or advantages of the invention will be set forth in part in the description which follows and, in part, will be apparent from the description, or may be learned by practice of the invention.

EFFECT

Exemplary embodiments of the present invention may provide a handover apparatus and method that measures a radial velocity of a terminal based on a received signal strength (RSS), and determines whether to perform a handover based on the measured radial velocity and thus, following effects may be provided.

First, a radial velocity of a terminal may be measured based on an RSS. An equation for the radial velocity of the terminal may be obtained based on a relationship between a path loss model and the RSS that is basically measured by the terminal and thus, the radial velocity may be measured without information associated with other factors in addition to the RSS.

Second, a delay occurring in a handover may be reduced. A handover may be determined based on whether an RSS measured by a terminal is greater than a threshold and thus, a delay occurring in a handover may be reduced.

Third, a ping-pong effect may be reduced. A handover may be determined based on a radial velocity with respect to a base station and thus, whether the terminal temporarily stays in a scope of a service of a cell during its movement. Thus, the ping-pong effect may be reduced.

The terminal may obtain a radial velocity with respect to each base station by measuring an RSS and thus, a performance of handover may be improved.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
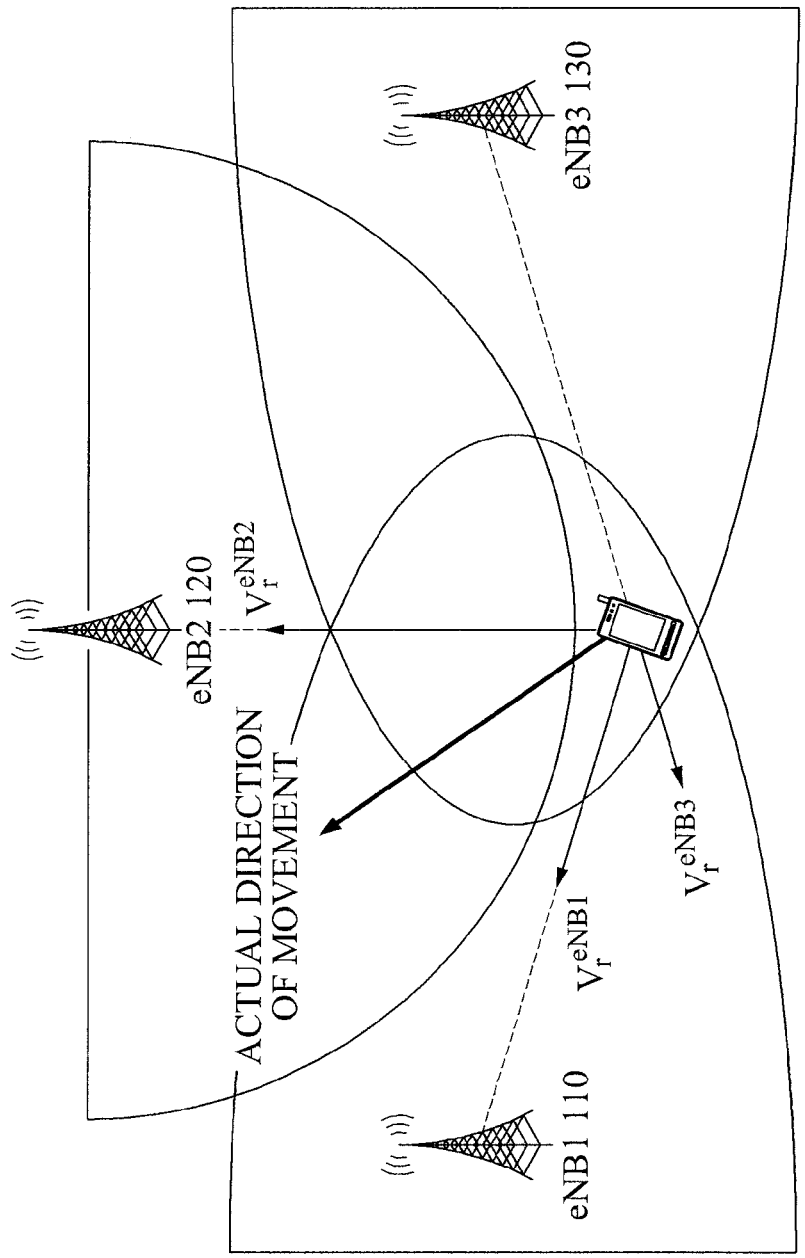
FIG. 1 is a diagram illustrating a radial velocity of a terminal that is measured with respect to each base station while the terminal moves according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

Example embodiments of the present invention describe a handover apparatus and method that measures a radial velocity of a wireless communication terminal based on information associated with a received signal strength (RSS) that the terminal continuously measures, and determines whether to perform a handover based on the measured radial velocity, so as to reduce a ping-pong effect.

In the process of measuring the radial velocity, the terminal may measure the radial velocity with respect to a base station based on a relationship between a path-loss model representing an energy loss and an equation obtained by applying integration to the RSS during a predetermined period of time. In the process of determining whether to perform a handover, the terminal may determine whether to perform a handover based on a radial velocity and a RSS associated with each base station.

A method of measuring a mobility of a terminal according to embodiments of the present invention may substitute a function associated with a time for an RSS function associated with a distance between the terminal and a base station. Subsequently, integration may be applied to the corresponding function so that the terminal may obtain an equation for the radial velocity with respect to the base station. A value obtained by calculating a cumulative mean of RSSs measured by the terminal and by estimating a distance between the terminal and the base station may be substituted for the equation in the previous process and thus, the radial velocity with respect to the base station may be measured. Hereinafter, the process of measuring the radial velocity will be described, in detail.

The terminal may define $P_m(t)$ [dBm] corresponding to an RSS from a predetermined base station, which may be measured at an arbitrary time so as to obtain an equation associated with the radial velocity. A high deviation may exist in a $P_m(t)$ measured for each time, due to a shadowing and multi-path padding, and thus, integration may be applied to $P_m(t)$ so as to minimize a steady state error in embodiments of the present invention. $I_{\Delta T}$ obtained by applying integration to $P_m(t)$ during an interval $\Delta T$ [sec] corresponding to a time period between $t_0$ and $t_1$ may be expressed as shown in Equation 1.

$$I_{\Delta T} = \int_{t_0}^{t_1} P_m(t) dt \quad \text{[Equation 1]}$$

In Equation 1, when the Okumura-Hata path-loss model is used to determine $P_m(t)$, $P_m(t)$ may be expressed as shown in Equation 2.

$$P_m(t) = P_{TX_0} - K_1 - K_2 \cdot \log_{10}(r(t)/1000) \quad \text{[Equation 2]}$$

In Equation 2, $P_{TX_0}$ [dBm] denotes a signal transmission power of the base station, $r(t)$ [m] denotes a distance between the base station and the terminal, $K_1$ [dB] and $K_2$ [dB] denote constants determined based on a length of a carrier frequency and a length of an antenna, respectively. When it is assumed that the terminal has a radial velocity of $v_r(=dr/dt)$ [m/sec] during a period time of $\Delta T$, Equation 2 may be expressed as shown in Equation 3.

$$r(t) = r(t_0) + v_r \cdot (t - t_0) \quad \text{[Equation 3]}$$

When Equation 3 is substituted for Equation 2, an equation may be obtained as shown in Equation 4.

$$P_m(t) = P_{TX_0} - K_1 - K_2 \cdot \log_{10}\{(r(t_0) + v_r \cdot (t - t_0))/1000\} \quad \text{[Equation 4]}$$

When it is assumed that $r(t)$ is significantly greater than $v_r \cdot \Delta T$ and Equation 4 is substituted for Equation 1, $I_{\Delta T}$ may approximate to an equation as shown in Equation 5.

$$I_{\Delta T} \approx (P_{TX_0} - K_1) \cdot \Delta T + C/v_r \quad \text{[Equation 5]}$$

In Equation 5, $$C = K_2 \cdot \Delta T \cdot (3 + \log_{10} e) + K_2 \cdot t_1 \cdot \log_{10}(1 - \Delta T/t_1) - K_2 \cdot \Delta T \cdot \log_{10}(r(t_1)/1000).$$

When Equation 5 is formulated for $v_r$, an equation that expresses a radial velocity of the terminal may be obtained as shown in Equation 6.

$$v_r \approx \frac{C}{I_{\Delta T} - (P_{TX_0} - K_1) \cdot \Delta T} \quad \text{[Equation 6]}$$

A $v_r$ may be calculated by substituting $r(t_1)$ and $I_{\Delta T}$ measured by the terminal to the equation for calculating a $v_r$. In this example, $r(t_1)$ denotes a distance between the terminal and the base station, which is estimated by that the terminal at a time $t_1$, and $r(t_1)$ may be obtained by reformulating Equation 2 as shown in Equation 7.

$$r(t_1) = 1000 \cdot \exp((P_{TX_0} - P_m(t_1) - K_1)/K_2) \quad \text{[Equation 7]}$$

Although Equation 1 most accurately measures $I_{\Delta T}$, embodiments of the present invention may approximate $I_{\Delta T}$ to Equation 8, since digital computers contained in the terminal may perform a discrete operation.

$$I_{\Delta T} \approx \sum_{n=0}^{N-1} (P_m(t_1 - n \cdot T_m) \cdot T_m) \quad \text{[Equation 8]}$$

Here, the terminal may measure an RSS N times at time intervals of $T_m$ during a time period of $\Delta T$. In this example, $T_m = \Delta T/N$. When the estimated $r(t_1)$ and $I_{\Delta T}$ are substituted for Equation 6, the terminal may estimate $v_r$, that is, the radial velocity with respect to the base station.

FIG. 1 illustrates a radial velocity of a terminal that is measured with respect to each base station while the terminal moves according to an embodiment of the present invention. Referring to FIG. 1, a radial velocity with respect to a first base station (eNB1) 110, a radial velocity with respect to a second base station (eNB2) 120, a radial velocity with respect to a third base station (eNB3) 130 may be assumed to be $v_r^{eNB1}$, $v_r^{eNB2}$, $v_r^{eNB3}$, respectively. A radial velocity may have a positive value when a terminal 100 moves away from the base station, and a radial velocity may have a negative value when the terminal 100 moves closer to the base station. Therefore, whether the terminal 100 is far away from the base station or close to the base station may be determined based on a plus or minus sign of the measured radial velocity.

Figure 2:
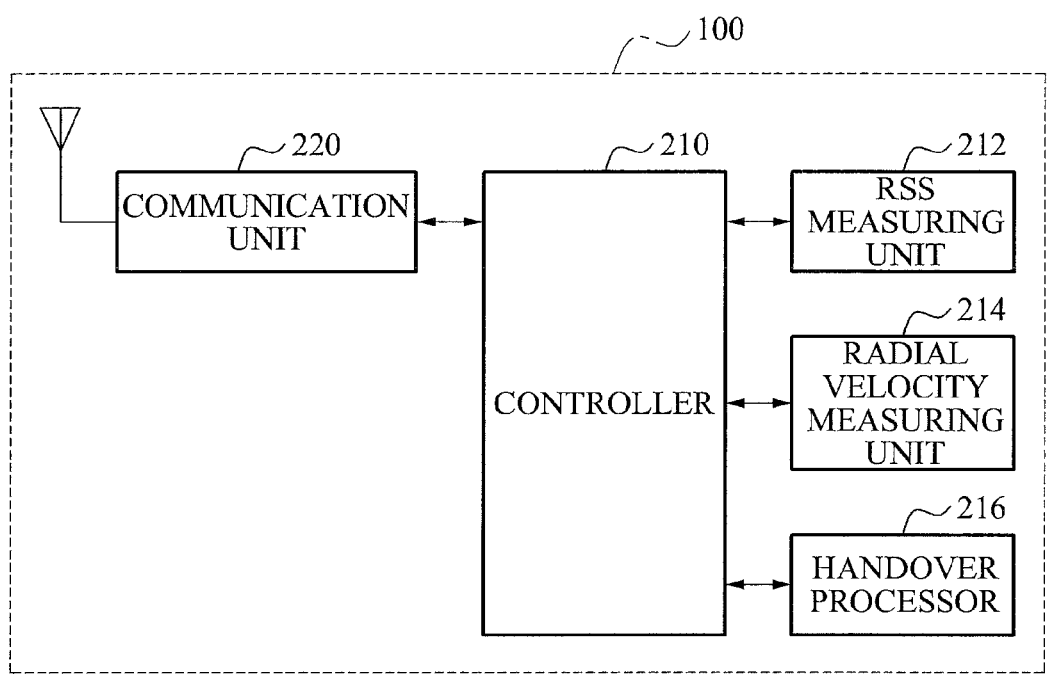
FIG. 2 is a diagram illustrating a configuration of a terminal that performs handover based on a received signal strength (RSS) and a radial velocity according to an embodiment of the present invention.

FIG. 2 illustrates a configuration of a terminal that performs handover based on a received signal strength (RSS) and a radial velocity according to an embodiment of the present invention. Referring to FIG. 2, the terminal 100 includes a controller 210, an RSS measuring unit 212, a radial velocity measuring unit 214, a handover processor 216, and a communication unit 220.

The communication unit 220 may transmit and receive a wireless signal of data input and output via an antenna (not illustrated). For example, in a case of data transmission, channel coding and spreading may be performed to data to be transmitted, the data is radio frequency (RF) processed, and the RF processed data is transmitted. In a case of data reception, a received RF signal may be converted to a baseband signal, and de-spreading and channel decoding may be performed on the baseband signal so as to restore data.

The RSS measuring unit 212 may measure an RSS from a currently accessed base station and RSSs from candidate base stations for handover.

The radial velocity measuring unit 214 may measure a radial velocity with respect to the currently accessed base station and radial velocities with respect to the candidate base stations for handover.

When the RSS from the currently accessed base station is less than or equal to a reference RSS, the handover processor 216 may determine whether to perform a handover based on the RSS measured by the RSS measuring unit 212 and the radial velocity measured by the radial velocity measuring unit 214, and may perform a handover.

The handover processor 216 may compare the RSS from the currently accessed base station and the reference RSS. When the RSS from the currently accessed base station is less than or equal to the reference RSS, the handover processor 216 may determine a base station having a highest RSS among the currently accessed base station and the candidate base stations for handover, and may determine a base station having a lowest radial velocity among the currently accessed base station and the candidate base stations for handover. The handover processor 216 may perform a handover to the base station having the highest RSS when the base station having the highest RSS is identical to the base station having the lowest radial velocity, and the base station having the highest RSS is different from the currently accessed base station.

As an example, when the base station having the highest RSS is different from the base station having the lowest radial velocity, the handover processor 216 may re-measure an RSS from the currently accessed base station and RSSs from the candidate base stations for handover using the RSS measuring unit 212, after a predetermined period of time. The handover processor 216 may perform a handover to a base station having a highest re-measured RSS when the base station having the highest re-measured RSS is different from the currently accessed base station.

As another example, when the base station having the highest RSS is different from the base station having the lowest radial velocity, the handover processor 216 may apply a higher weight to a base station as an RSS is higher and may apply a higher weight to a base station as a radial velocity is lower, and may determine an order of priority of the currently accessed base station and the candidate base stations for handover in an order of a high weight. The handover processor 216 may perform a handover to a base station having a highest order of priority when the base station having the highest priority order is different form the currently accessed base station.

As still another example, the handover processor 216 may perform a handover to the base station having the lowest radial velocity when the base station having the highest RSS is different from the currently accessed base station and the base station having the lowest radial velocity is different from the currently accessed base station.

As yet another example, the handover processor 216 may perform a handover to one of the base stations having the highest RSS and the base station having the lowest radial velocity when the base station having the highest RSS is different from the base station having the lowest radial velocity.

The controller 210 may control general operations of the terminal 100. The controller 210 may perform functions of the RSS measuring unit 212, the radial velocity measuring unit 214, and the handover processor 216. The controller 210, the RSS measuring unit 212, the radial velocity measuring unit 214, and the handover processor 216 are separately illustrated so as to describe respective functions. Therefore, the controller 210 may include at least one processor configured to perform respective functions of the RSS measuring unit 212, the radial velocity measuring unit 214, and the handover processor 216. Also, the controller 210 may include at least one processor configured to perform at least one of functions of the RSS measuring unit 212, the radial velocity measuring unit 214, and the handover processor 216.

Hereinafter, a handover method of a terminal configured according to embodiments of the present invention, based on an RSS and a radial velocity will be described with reference to FIG. 3.

Figure 3:
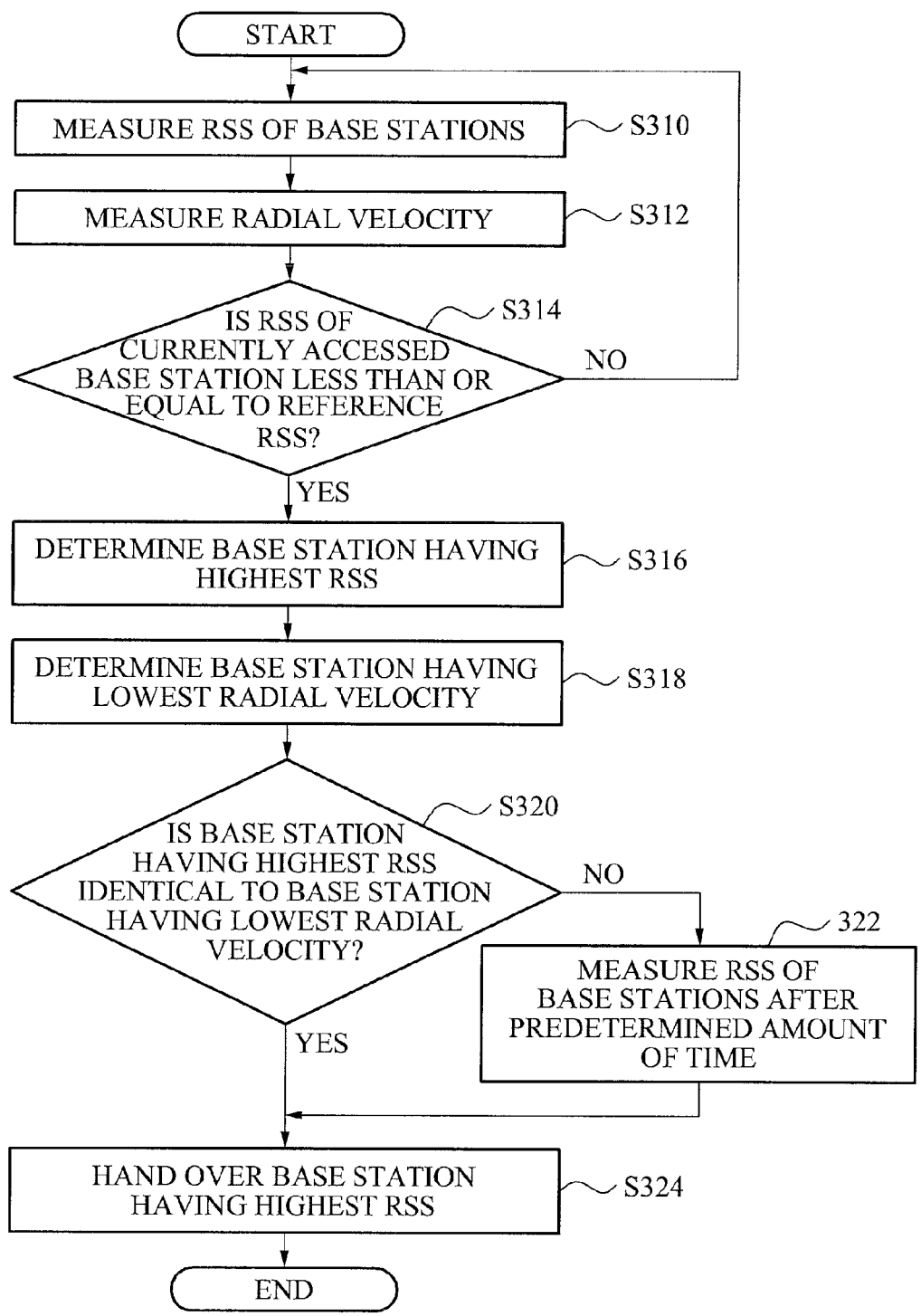
FIG. 3 is a flowchart illustrating a process of handover of a terminal based on an RSS and a radial velocity according to an embodiment of the present invention.

FIG. 3 illustrates a process of handover of a terminal based on an RSS and a radial velocity according to an embodiment of the present invention.

Referring to FIG. 3, the terminal 100 may measure an RSS from a currently accessed base station and RSSs from candidate base stations for handover at predetermined time intervals in operation 310.

In operation 312, the terminal 100 may measure a radial velocity with respect to the currently accessed base station and radial velocities with respect to the candidate base stations for handover.

In operation 314, the terminal 100 may determine whether the RSS from the currently accessed base station is less than or equal to a reference RSS.

When the RSS from the currently accessed base station is greater than the reference RSS, the terminal may proceed with operation 310.

When the RSS from the currently accessed base station is less than or equal to the reference RSS, the terminal 100 may determine a base station having a highest RSS among the currently accessed base station and the candidate base stations for handover in operation 316.

In operation 318, the terminal 100 may determine a base station having a lowest radial velocity among the currently accessed base station and the candidate base stations for handover.

In operation 320, the terminal 100 may determine whether the base station having the highest RSS is identical to the base station having the lowest radial velocity.

When the base station having the highest RSS is different from the base station having the lowest radial velocity, the terminal 100 may re-measure an RSS from the currently accessed base station and RSSs from the candidate base stations for handover, after a predetermined period of time in operation 322.

In operation 324, the terminal 100 may perform a handover to a base station having a highest re-measured RSS when the base station having the highest re-measured RSS is different from the currently accessed base station.

When the base station having the highest RSS is identical to the base station having the lowest radial velocity, the terminal 100 may perform a handover to the base station having the highest RSS when the base station having the highest RSS is different from the currently accessed base station in operation 324.

The method according to the above-described embodiments of the present invention may be recorded in non-transitory computer readable media including program instructions to implement various operations embodied by a computer. The media may also include, alone or in combination with the program instructions, data files, data structures, and the like. The program instructions recorded in the media may be designed and configured for the present invention or may already be used since it is known by those skilled in the computer software field.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A handover apparatus of a terminal, the handover apparatus comprising:
   a received signal strength (RSS) measuring unit to measure an RSS from a currently accessed base station and RSSs from candidate base stations for handover;
   a radial velocity measuring unit to measure a radial velocity with respect to the currently accessed base station and radial velocities with respect to the candidate base stations for handover;
   a handover processor to perform a handover by determining a base station for handover based on the measured RSSs and the measured radial velocities when the RSS from the currently accessed base station is less than or equal to a reference RSS;
   re-measuring of the RSS from the currently accessed base station and RSSs from the candidate base stations for handover through the RSS measuring unit, after a predetermined period of time when the base station having the highest RSS is different from the base station having the lowest radial velocity; and
   the handover to the base station having a highest re-measured RSS when the base station having the highest re-measured RSS is different from the currently accessed base station.

2. The handover apparatus of claim 1, wherein the radial velocity measuring unit measures the radial velocity with respect to the currently accessed base station based on the RSS from the currently accessed base station, and measures the radial velocities with respect to the candidate base stations for handover based on the RSSs from the candidate base stations for handover.

3. The handover apparatus of claim 1, wherein, when the RSS from the currently accessed base station is less than or equal to the reference RSS, the handover processor performs:
   determining of the base station having the highest RSS among the currently accessed base station and the candidate base stations for handover,
   determining of a base station having a lowest radial velocity among the currently accessed base station and the candidate base stations for handover, and
   the handover to the base station having the highest RSS when the base station having the highest RSS is identical to the base station having the lowest radial velocity, and the base station having the highest RSS is different from the currently accessed base station.

4. The handover apparatus of claim 3, wherein, when the base station having the highest RSS is different from the base station having the lowest radial velocity, the handover processors performs:
   determining of an order of priority of the currently accessed base station and the candidate base stations for handover by applying a higher weight to a base station as an RSS is higher and applying a higher weight to a base station as a radial velocity is lower, and
   a handover to a base station having a highest order of priority when the base station having the highest order of priority is different from the currently accessed base station.

5. The handover apparatus of claim 3, wherein the handover processor performs a handover to the base station having the lowest radial velocity when the base station having the highest RSS is different from the base station having the lowest radial velocity, and the base station having the lowest radial velocity is different from the currently accessed base station.

6. The handover apparatus of claim 3, wherein the handover processor performs a handover to one of the base station having the highest RSS and the base station having the lowest radial velocity when the base station having the highest RSS is different from the base station having the lowest radial velocity.

7. A handover method of a terminal, the handover method comprising:
   measuring a received signal strength (RSS) from a currently accessed base station and RSSs from candidate base stations for handover;
   measuring a radial velocity with respect to the currently accessed base station and radial velocities with respect to the candidate base stations for handover;
   determining a base station having a highest RSS among the currently accessed base station and the candidate base stations for handover when the RSS from the currently accessed base station is less than or equal to a reference RSS;
   determining a base station having a lowest radial velocity among the currently accessed base station and the candidate base stations for handover; and
   performing a handover to the base station having the highest RSS when the base station having the highest RSS is identical to the base station having the lowest radial velocity, and the base station having the highest RSS is different from the currently accessed base station;

re-measuring the RSS from the currently accessed base station and RSSs from the candidate base stations for handover after a predetermined period of time when the base station having the highest RSS is different from the base station having the lowest radial velocity, and performing the handover to the base station having a highest re-measured RSS when the base station having the highest re-measured RSS is different from the currently accessed base station.

8. The handover method of claim 7, wherein the measuring of the radial velocity comprises:

measuring the radial velocity with respect to the currently accessed base station based on the RSS from the currently accessed base station; and measuring the radial velocities with respect to the candidate base stations for handover based on the RSSs from the candidate base stations for handover.

9. The handover method of claim 7, wherein, when the base station having the highest RSS is different from the base station having the lowest radial velocity, the handover method further comprises:

determining an order of priority of the currently accessed base station and the candidate base stations for handover by applying a higher weight to a base station as an RSS is higher and applying a higher weight to a base station as a radial velocity is lower, and performing a handover to a base station having a highest order of priority when the base station having the highest order of priority is different from the currently accessed base station.

10. The handover method of claim 7, further comprising:

performing a handover to the base station having the lowest radial velocity when the base station having the highest RSS is different from the base station having the lowest radial velocity, and the base station having the lowest radial velocity is different from the currently accessed base station.

11. The handover method of claim 7, further comprising:

performing a handover to one of the base station having the highest RSS and the base station having the lowest radial velocity when the base station having the highest RSS is different from the base station having the lowest radial velocity.

* * * * *